(12) United States Patent
Lee et al.

(10) Patent No.: US 9,703,610 B2
(45) Date of Patent: Jul. 11, 2017

(54) EXTENSIBLE CENTRALIZED DYNAMIC RESOURCE DISTRIBUTION IN A CLUSTERED DATA GRID

(75) Inventors: Robert Lee, San Carlos, CA (US); Gene Gleyzer, Lexington, MA (US); Mark Falco, Burlington, MA (US); Cameron Purdy, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 119 days.

(21) Appl. No.: 13/239,253

(22) Filed: Sep. 21, 2011

(65) Prior Publication Data

US 2012/0297056 A1 Nov. 22, 2012

Related U.S. Application Data

(60) Provisional application No. 61/486,701, filed on May 16, 2011.

(51) Int. Cl.
*G06F 9/50* (2006.01)
*G06F 17/30* (2006.01)
*H04L 29/08* (2006.01)

(52) U.S. Cl.
CPC ...... *G06F 9/5083* (2013.01); *G06F 17/30575* (2013.01); *H04L 67/10* (2013.01)

(58) Field of Classification Search
CPC .................................................. G06F 17/30575
(Continued)

(56) References Cited

U.S. PATENT DOCUMENTS

2002/0055972 A1* 5/2002 Weinman, Jr. ................ 709/203
2003/0093439 A1* 5/2003 Mogi et al. .................... 707/200
(Continued)

FOREIGN PATENT DOCUMENTS

CN 101442435 5/2009
CN 102014137 4/2011

OTHER PUBLICATIONS

Wang, Dynamic Data Migration Policies for Query-Intensive Distributed Data Environment. Fall 2009, Advances in Data and Web Management, Joint International Conferences, APWeb/WAIM 2009, Suzhou, China, Apr. 2-4, 2009, Proceedings, Lecture Notes in Computer Science (LNCS) 5446, Springer, pp. 63-75.*
(Continued)

*Primary Examiner* — Anthony Mejia
*Assistant Examiner* — Joseph M Cousins
(74) *Attorney, Agent, or Firm* — Tucker Ellis LLP

(57) ABSTRACT

A centralized resource distribution is described where the decision portion of partitioning data among cluster nodes is made centralized while the actual mechanics to implement the partitioning remain a distributed algorithm. A central distribution coordinator is used to create an extensible central strategy that controls how the data will be partitioned across the cluster. The work to implement this strategy is performed by all of the members individually and asynchronously, in accordance with a distributed algorithm. The central strategy can be communicated to all cluster members and each member can perform the partitioning as it relates to itself. For example, in accordance with the distributed algorithm, one node may decide that it needs to obtain a particular partition in light of the central strategy and carry out the necessary steps to obtain that data, while other nodes may be asynchronously performing other individual partition transfers relevant to those particular nodes.

16 Claims, 5 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2006/0059253 A1* | 3/2006 | Goodman | G06Q 10/10 |
| | | | 709/223 |
| 2006/0277180 A1* | 12/2006 | Okamoto | 707/7 |
| 2008/0086616 A1* | 4/2008 | Asano et al. | 711/165 |
| 2008/0294646 A1 | 11/2008 | Chang | |
| 2009/0132657 A1* | 5/2009 | Surtani et al. | 709/205 |
| 2009/0259665 A1* | 10/2009 | Howe | G06F 17/30212 |
| 2011/0179231 A1* | 7/2011 | Roush | 711/152 |
| 2011/0276630 A1* | 11/2011 | Ekblom et al. | 709/204 |
| 2012/0254118 A1* | 10/2012 | Shah et al. | 707/645 |
| 2013/0024426 A1* | 1/2013 | Flowers | G06F 11/1456 |
| | | | 707/654 |

OTHER PUBLICATIONS

State Intellectual Property Office of the People's Republic of China, Search Report dated Feb. 1, 2016 for Chinese Application No. 201280023355.1, 2 pages.

\* cited by examiner

EXTENSIBLE CENTRALIZED DYNAMIC RESOURCE DISTRIBUTION IN A CLUSTERED DATA GRID

CLAIM OF PRIORITY

The present Application claims priority to the following United States Provisional Patent Application, which is incorporated herein in its entirety:

U.S. Provisional Patent Application Ser. No. 61/486,701, entitled "EXTENSIBLE CENTRALIZED DYNAMIC RESOURCE DISTRIBUTION IN A CLUSTERED DATA GRID," by Robert Lee et al., filed on May 16, 2011.

CROSS REFERENCE TO RELATED APPLICATIONS

The present application is related to the following United States provisional patent application, which is incorporated by reference herein in its entirety:

U.S. Provisional Patent Application Ser. No. 61/437,521, entitled "IN-MEMORY DATA GRID FOR MANAGING DATA USED BY APPLICATION OBJECTS," by Christer Fahlgren et al., filed on Jan. 28, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to data caching techniques in distributed computing environments and in particular to partitioning data among members of a cluster network.

BACKGROUND

Distributed computing and distributed algorithms have become prevalent in a wide variety of contexts, for reasons of increased performance and load capacity, high availability and failover and faster access to data. Distributed computing typically involves a number of autonomous computers (also called nodes) in communication with one another to solve a task, such as execute an application, solve complex computational problems or provide users access to various services. Each of the computer nodes typically includes its own processor(s), memory and a communication link to other nodes. The computers can be located within a particular location (e.g. cluster network) or can be connected over a large area network (LAN) such as the Internet. In most cases, distributed computers use messages to communicate with one another and to coordinate task processing and data management.

Data management is a significant issue in distributed computing. In the context of a cluster network, large data sets can be partitioned among the various nodes of the cluster. Each node usually stores a number of such partitions (subparts of the entire data set) and performs transactions on the partitions. In many cases, partitions include primary and backup copies of data distributed among the members for purposes of failover. The distribution of data in this partitioned manner can improve manageability, performance and availability of information.

There exist a number of constraints and concerns that influence the ideal distribution of data within this context. For example, moving data from one server to another incurs expenses of time and/or processor capacity. For high availability reasons, it is often preferable to locate the primary and backup copy of data on physically distinct machines. Additionally, for performance, scalability, and capacity reasons, it is often preferable to balance the distribution of data somewhat equally among available storage servers and to adjust that distribution when nodes are added or removed from the cluster.

In some use-cases, further application-specific preferences may be desired. For example, specifying that a particular set of data should be located on a specific server can be useful under certain circumstances. Furthermore, it may be desirable to specify that the distribution should use runtime feedback and inputs to place data among the node members. In light of the foregoing, what is needed is a simple and efficient way to address all or many of data distribution concerns and to optimize the balancing of partitions among the distributed cluster members.

BRIEF SUMMARY

In accordance with various embodiments of the invention, the decision portion of partitioning data among cluster nodes is made centralized while the actual mechanics to implement the partitioning remain a distributed algorithm. A central distribution coordinator can execute a centralized logic or algorithm (strategy) that generates a distribution plan. The distribution plan controls how data will be partitioned across the entire cluster. The work to implement this distribution plan is performed by all of the members individually and asynchronously, in accordance with a distributed algorithm. The distribution plan can be communicated to all of the members of the cluster and then each member performs the partitioning as it relates to itself only. For example, in accordance with the distributed algorithm, one node may decide that it needs to obtain a particular partition in light of the distribution plan and carry out the necessary steps to obtain that data, while other nodes may be asynchronously performing other individual partition transfers relevant to those particular nodes. In this manner, bottlenecks caused by a single point of coordination can be prevented, while simultaneously enabling centralized management and control for the data distribution.

DETAILED DESCRIPTION

Figure 1:
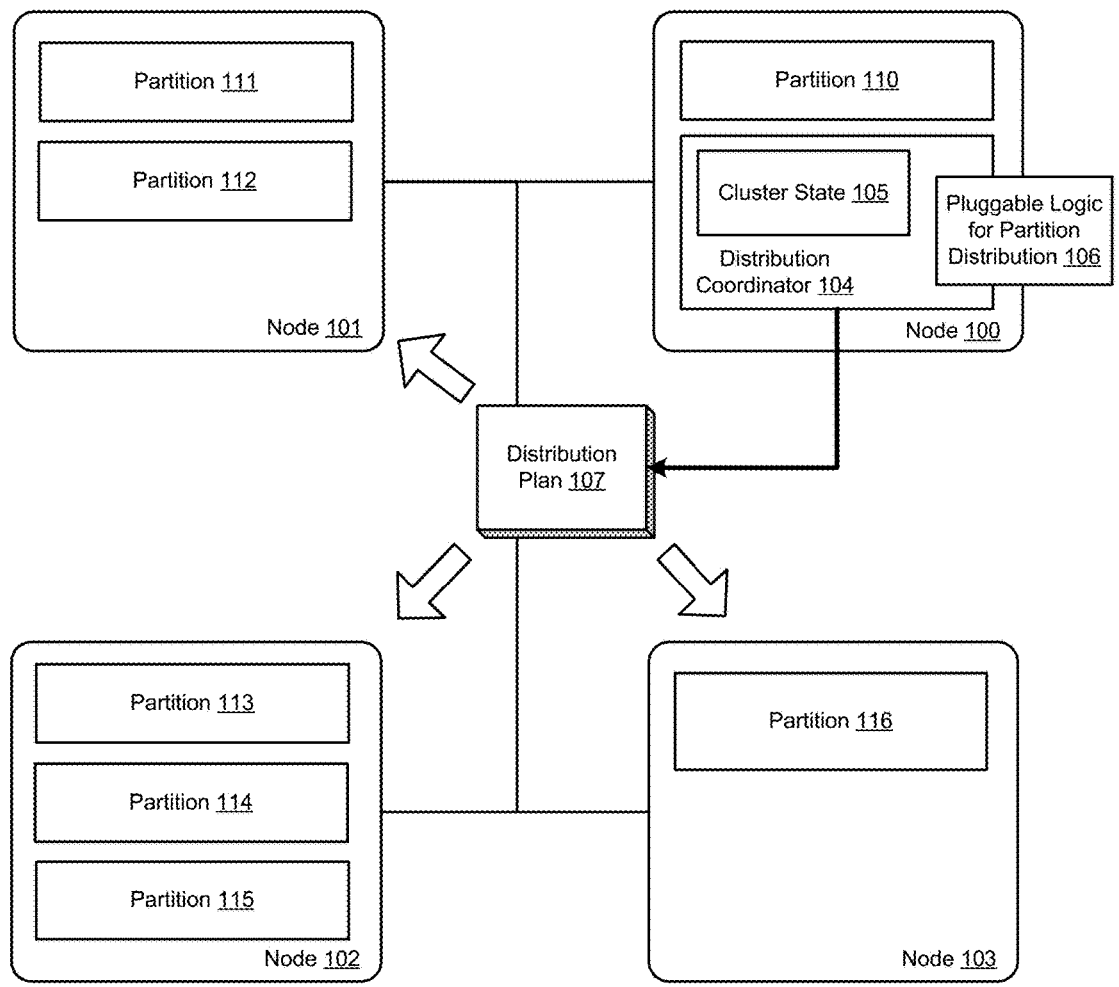
FIG. 1 is an illustration of extensible centralized resource distribution being implemented in a cluster, in accordance with various embodiments of the invention.

One of the functions in a clustered data-grid is to maintain and effect the distribution of the data storage partitions among various cluster members (nodes). In this context, distribution can be considered the placement of both primary and backup copies of the data on a given cluster member server providing data storage.

One way to implement data partitioning across the cluster is by implementing a distributed algorithm where every storage server independently makes a decision whether to move a partition that it owns to another server or whether to obtain a partition from another server. By way of example, the data set of the cluster may initially comprise 256 primary partitions (with corresponding 256 backup partitions) which are evenly distributed across two cluster members (nodes), each member storing 128 primary and 128 backup partitions. If a third member were to join the cluster, the members could re-distribute the partitions amongst one another such that each node would store 85 partitions with one of the nodes storing 86. For example, the newly joined member node can request that each of the other two nodes in the cluster transfer 43 partitions to the new node. Alternatively, the other two nodes may determine that a new member has joined the cluster and independently transfer the partitions to the new node.

This autonomous and disconnected approach of using a distributed algorithm to allocate the partitions provides a number of advantages, including better scalability, eliminating single points of failure and the like. However, it also becomes significantly more difficult to implement complex distribution strategies because the member nodes are making independent decisions regarding the partition transfers. For example, it may be desirable to distribute the partitions according to more dynamic and complex factors, such as how often the particular partitions are likely to be accessed, the current processing load on a particular member node and the CPU/memory capacity of each node. Moreover, it may be desirable to coordinate the arrangement of primary and backup partitions in a more complex and optimized manner for reasons of high availability and failover.

In accordance with various embodiments, a solution is described wherein individual partition transfers are performed point-to-point (as a result of direct but asynchronous communication between the sender node and the recipient node), but allow for a single point of coordination (the distribution coordinator). This single-point of coordination provides a global state of the cluster that includes the current distribution (data owners), as well as dynamic runtime feedback, such as processing load on each node in the cluster at a given point in time. The ability to have a global-view of the system at a single point allows for much more expressive distribution logic than the alternative of a distributed algorithm.

In accordance with an embodiment, each server node in the cluster communicates distribution state to the distribution coordinator on an infrequent basis. The distribution coordinator collects this information and periodically (or as a result of membership change) calls the configured distribution strategy to analyze the distribution. Additionally, an interface to the pluggable logic (strategy) can be supplied, which provides the strategy access to the current distribution state and is used by the strategy to suggest a new distribution (arrangement) of the partitions among the available server nodes.

In accordance with an embodiment, the distribution coordinator collects the suggestions made by the distribution strategy into an overall distribution plan or goal. The plan is communicated to all nodes in the cluster. Thereafter, each server initiates individual partition transfers (data movements) to approach the new distribution plan.

In accordance with various embodiments, the extensible centralized distribution can also form the basis for various additional features. For example, adaptive distribution allows the cluster to adapt dynamically to fluctuations in application load or data distribution. Furthermore, the centralized distribution can be useful for WAN-safe clustering.

FIG. 1 is an illustration of extensible centralized resource distribution being implemented in a cluster, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the cluster is comprised of a number of nodes (100, 101, 102, 103) that store data partitions (110, 111, 112, 113, 114, 115, 116) distributed throughout. One of the nodes 100 in the cluster is designated to be the central distribution coordinator 104. In accordance with an embodiment, the distribution coordinator periodically reevaluates the distribution (arrangement) of partitions across the cluster based on a number of factors and determines whether changes should be made to it. For example, the distribution coordinator can evaluate the partition placement according to the current request load on each node, how often a particular partition is likely to be accessed and/or the memory and CPU capacity of the node. Similarly, the central distribution coordinator 104 can be used to perform more complex distribution of primary versus backup partitions. For example, for all the primary partitions on a particular node, the distribution coordinator can ensure that the backup partitions associated with those primary partitions are not distributed across a large number of nodes. It is normally preferable that the backup partition is placed on a different physical node than the primary partition associated with it for failover purposes. However, when a primary partition is updated, the backup partitions on it will also need to be updated. This can cause a significant number of node jumps, adding to network traffic across the cluster. For this reason, it can be advantageous to limit the number of nodes that the backup partitions are located on. The central distribution coordinator can enforce this strategy, as well as any other partition arrangement strategies.

In accordance with an embodiment, the distribution coordinator 104 maintains a view of the global cluster state 105. The global state can include information including (but not limited to) the location of the partitions among the nodes, the processing load on each node, the likely demand for the data stored in each partition, the CPU and/or memory capacity of each node, and the like. In accordance with an embodiment, the distribution coordinator employs the global state to periodically (or in response to node member changes) reevaluate the partition distribution across the cluster. It should be noted that the global cluster state need not necessarily be stored on the distribution coordinator and can alternatively be stored on other members of the cluster, as well as remotely on other machines.

In accordance with an embodiment, the distribution coordinator 104 can invoke a pluggable logic component 106 in order to evaluate the partition distribution. The pluggable logic 106 can specify a particular custom distribution strategy that should be used for the cluster. The distribution coordinator can evaluate the partition distribution according to that strategy and determine whether changes should be made to it.

If the distribution coordinator 104 determines that changes should be made to the partition distribution, it can generate a distribution plan 107. This distribution plan can then be made available to each node in the cluster. In accordance with an embodiment, the distribution plan 107 can specify which partitions should be located on which node. Once the new distribution plan is made available, the various nodes can go about making the appropriate partition transfers in a distributed fashion, as will be described below.

Figure 2:
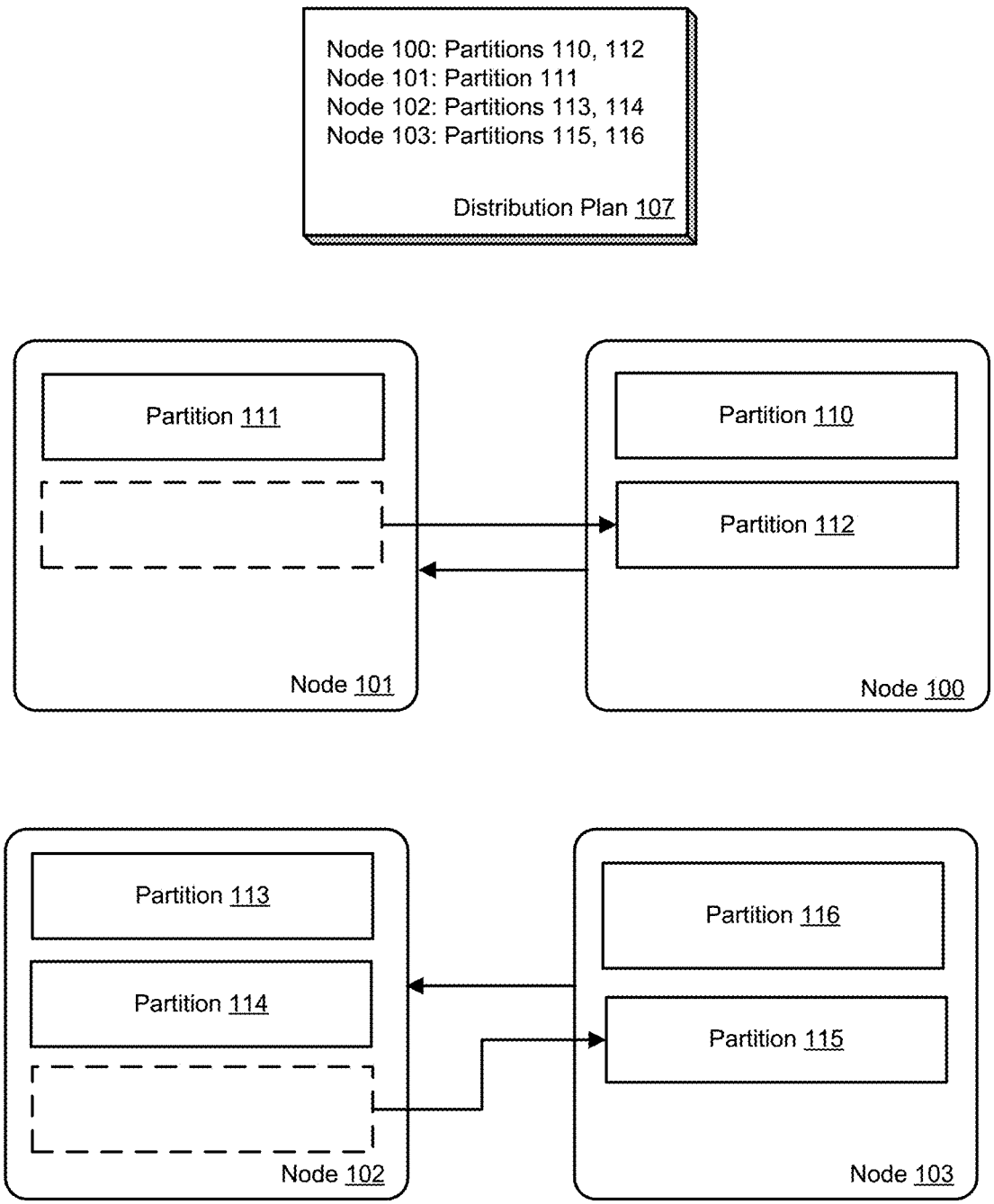
FIG. 2 is an illustration of the distribution plan being implemented by the nodes in the cluster, in accordance with various embodiments of the invention.

FIG. 2 is an illustration of the distribution plan being implemented by the nodes in the cluster, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In accordance with the illustrated embodiment, once the distribution coordinator generates the distribution plan, it can make the plan available to each node in the cluster. The nodes can then independently perform the decisions and steps necessary to transfer the partitions to the right nodes according to the distribution plan. In this manner, the mechanics of distributing the partitions remains a distributed algorithm, while the decision and strategy of partition arrangement is made centralized.

As illustrated, the new distribution plan 107 specifies that node 100 should store partitions 110 and 112; node 101 should store partition 111; node 102 should store partitions 113 and 114; and node 103 should store partitions 115 and 116. Because partition 112 was currently located on node 101, node 100 can inspect the new distribution plan and request partition 112 from node 101. Similarly, node 103 can request partition 115 from node 102. In accordance with alternative embodiments, nodes 101 and 102 can transfer the necessary partitions to nodes 100 and 103 after receiving the distribution plan, without waiting for any requests from nodes 100 and 103.

Figure 3:
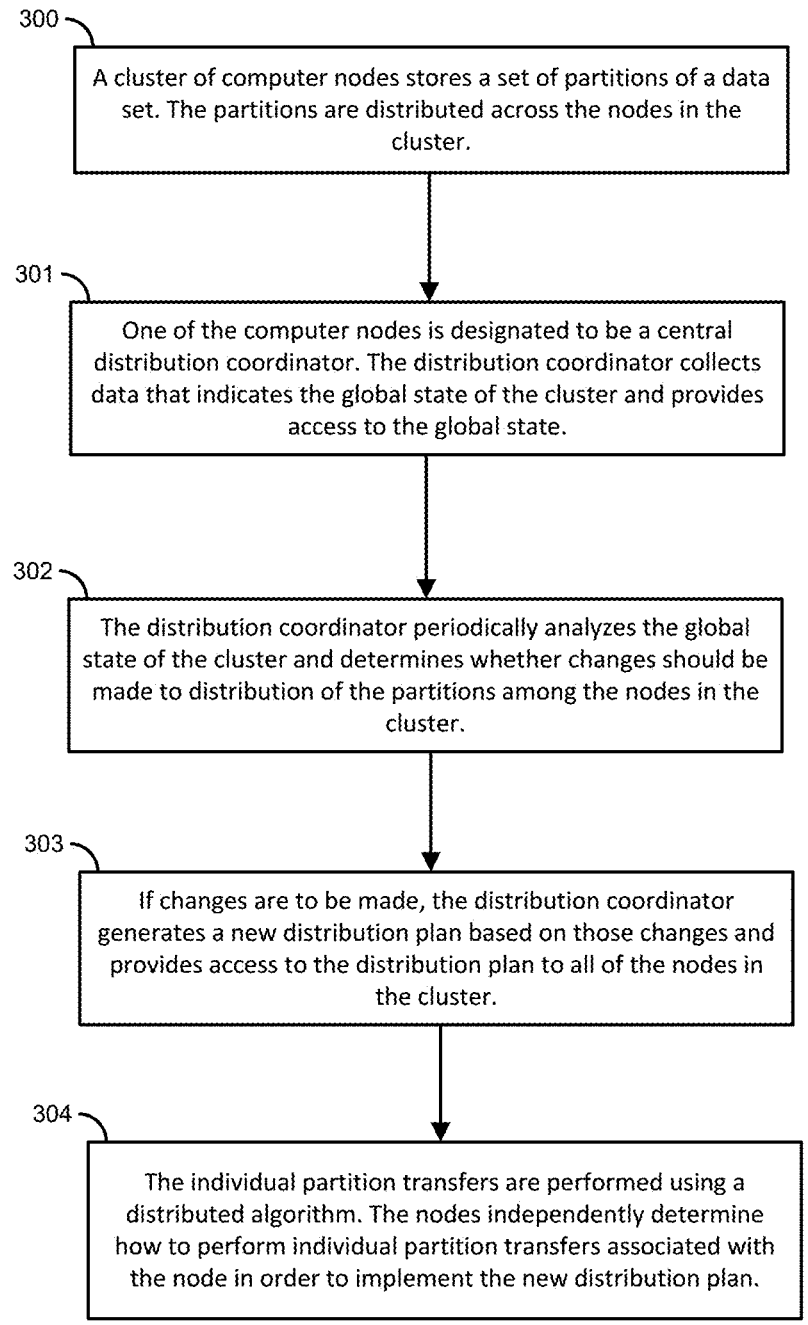
FIG. 3 is a flow chart illustration of a process for providing centralized resource distribution, in accordance with various embodiments of the invention.

FIG. 3 is a flow chart illustration of a process for providing centralized resource distribution, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in step 300, a cluster of computer nodes store a data set as a number of partitions. These partitions are distributed across the nodes in the cluster. In step 301, one of the computer nodes is designated to be a central distribution coordinator. In accordance with an embodiment, the distribution coordinator collects data that indicates the global state of the cluster and provides access to the global state. As further shown in step 302, the distribution coordinator periodically analyzes the global state of the cluster and determines whether changes should be made to distribution of the partitions among the nodes in the cluster. Alternatively, the distribution coordinator may reevaluate the partition distribution in response to membership changes in the cluster rather than periodically.

If the distribution coordinator determines that changes should be made, it generates a new distribution plan based on those changes and provides access to the distribution plan to all of the nodes in the cluster, as shown in step 303. The individual partition transfers can then be performed using a distributed algorithm, as shown in step 304. In other words, each node can independently determine how to perform individual partition transfers involving it in order to optimally implement the new distribution plan.

Figure 4:
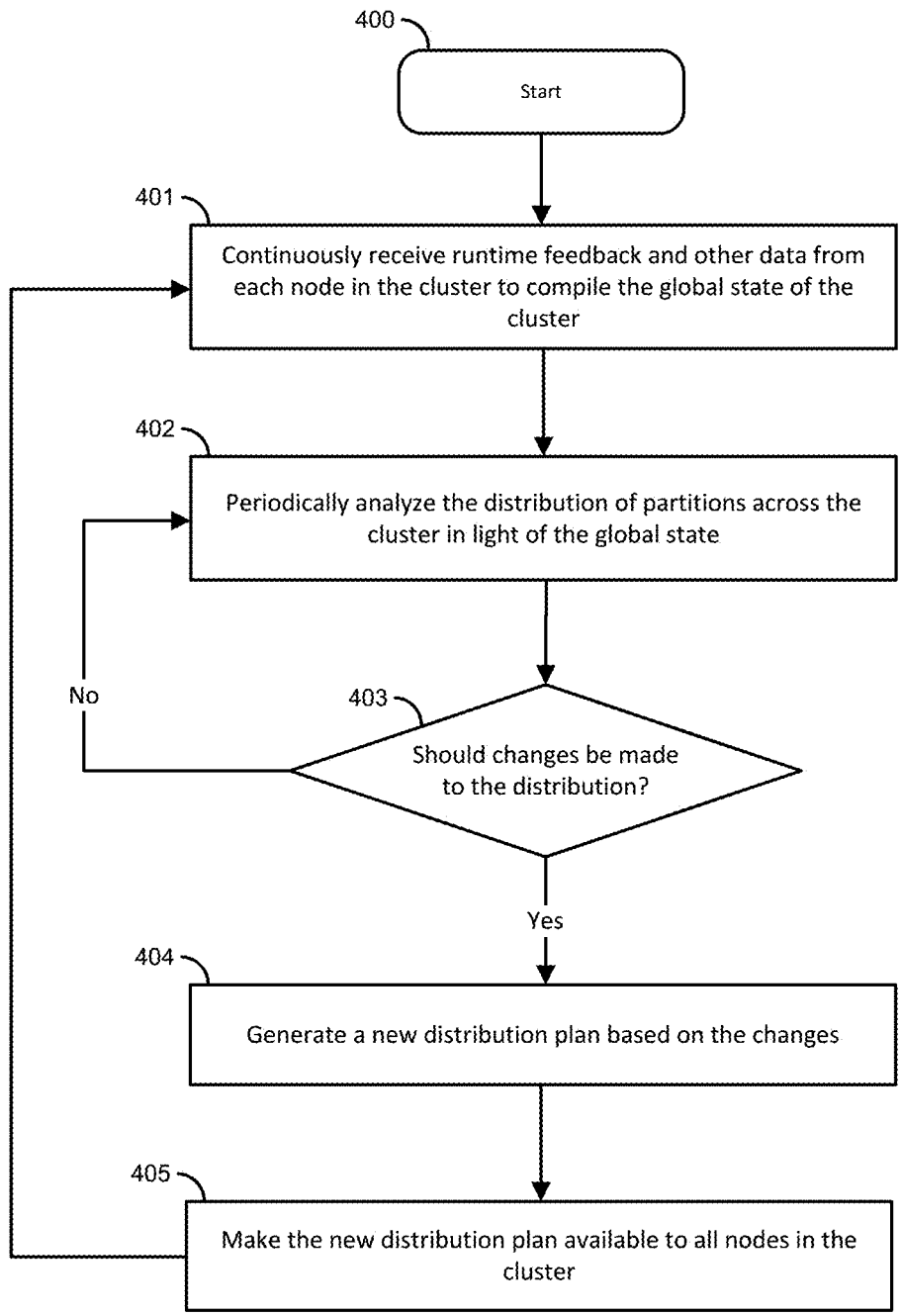
FIG. 4 is a flow chart illustration of a process performed by the distribution coordinator, in accordance with various embodiments of the invention.

FIG. 4 is a flow chart illustration of a process performed by the distribution coordinator, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In accordance with the illustrated embodiment, the process begins in step 400. Once initiated, the distribution coordinator continuously receives runtime feedback and other data from each node in the cluster in order to compile the global state of the cluster (step 401). The distribution coordinator can use this global state to periodically analyze the distribution of partitions across the cluster, as shown in step 402. If no changes are needed (step 403), the distribution coordinator can perform no action until the next time that it needs to evaluate the partition distribution. If, on the other hand, the distribution coordinator determines that changes should be made to the distribution, it can generate a new distribution plan that includes those changes, as shown in step 404. In step 405, the distribution coordinator can provide the distribution plan to all of the nodes in the cluster.

Figure 5:
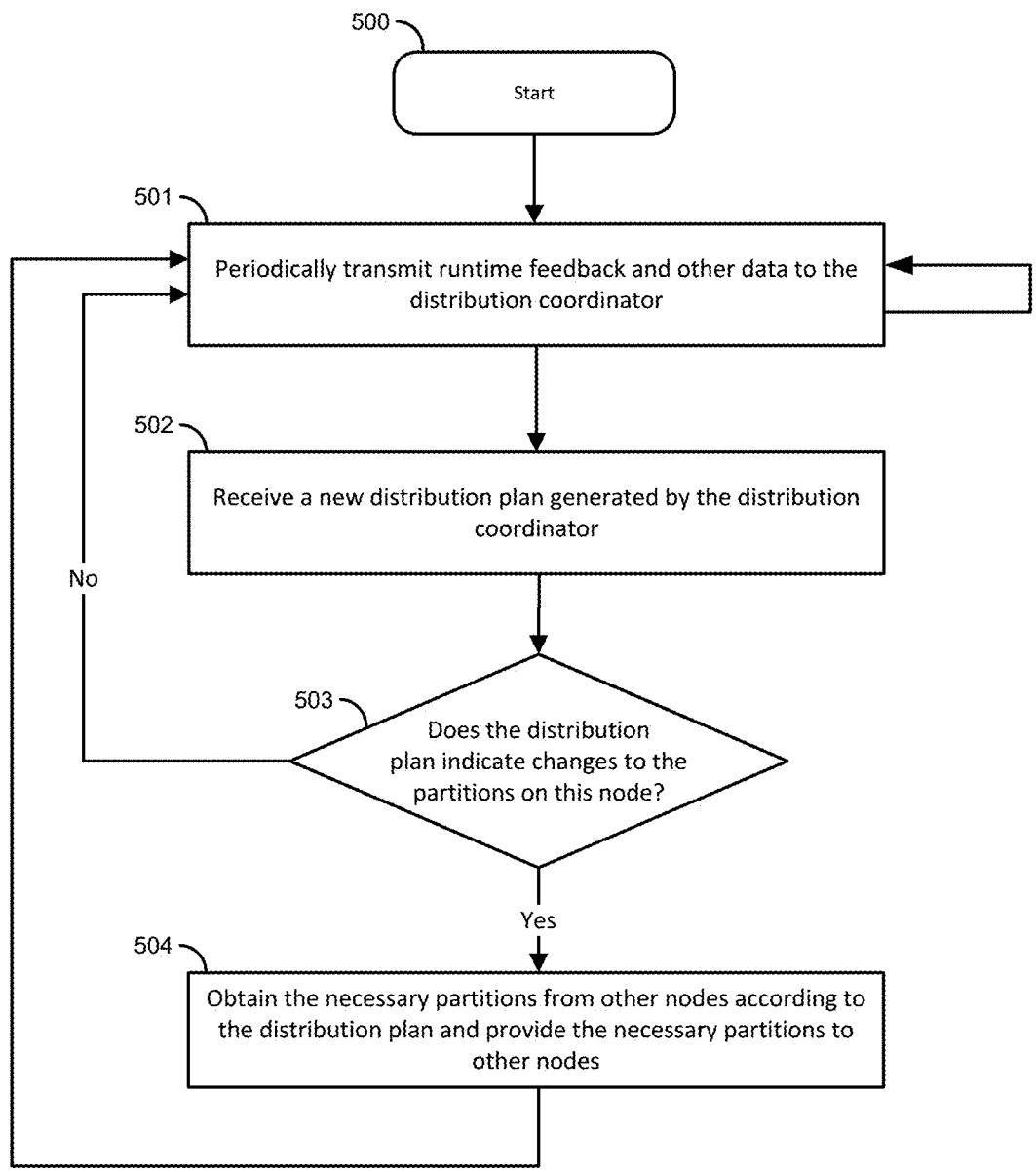
FIG. 5 is a flow chart illustration of a process performed by the nodes in the cluster, in accordance with various embodiments of the invention.

FIG. 5 is a flow chart illustration of a process performed by the nodes in the cluster, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In accordance with the illustrated embodiment, the process begins in step 500. Once initiated, each node can periodically transmit runtime feedback, load statistics and other data to the distribution coordinator, as shown in step 501. Step 501 further includes an arrow back onto itself, representing a possibility that no new plan is generated, and the member simply continues to run, periodically gathering and transmitting statistics.

In step 502, the node may receive a new distribution plan from the distribution coordinator. At this point, the node may inspect the distribution plan and determine whether the plan specifies changes that are relevant to this particular node (step 503). If the new plan does not involve the node, the node can perform no transfers and can continue to periodically send runtime feedback to the distribution coordinator. If, on the other hand, the distribution plan includes partition changes that involve the node, the node can go about obtaining the necessary partitions from other nodes according to the distribution plan and/or provide the necessary partitions to other nodes (step 504).

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for managing storage of a large data set partitioned into a plurality of partitions in a data grid cluster comprising a plurality of computer nodes each comprising a microprocessor and memory, said method comprising:
   designating one computer node in said data grid cluster to be a distribution coordinator;
   executing a distribution strategy on said distribution coordinator to generate a distribution plan which identifies, for all of said plurality of partitions, which of said plurality of partitions should be stored on which of said plurality of computer nodes in the data grid cluster;
   storing said plurality of partitions in said memory of said plurality of computer nodes of the data grid cluster in accordance with said distribution plan;
   receiving, at the distribution coordinator, runtime feedback from each of the plurality of computer nodes in the data grid cluster;
   analyzing, by the distribution coordinator, a global state of the data grid cluster, which comprises said distribution plan and said runtime feedback, in order to determine whether changes should be made to the distribution plan;
   executing the distribution strategy on said distribution coordinator, using said global sate of the data grid cluster, to generate a new distribution plan which identifies, for all of said plurality of partitions, which of said plurality of partitions should be stored on which of said plurality of computer nodes in the data grid cluster;
   accessing the new distribution plan from each of said plurality of computer nodes in the data grid cluster;
   analyzing the new distribution plan in each computer node in the data grid cluster to determine whether the new distribution plan specifies changes to which partitions which should be stored in memory of said each node, and if so then one or both of
      initiating, in said each of said plurality of computer nodes, a transfer of one or more partition from other computer nodes of the plurality of computer nodes to said each computer node or
      initiating, in said each of said plurality of computer nodes, a transfer of one or more partition from said each computer node to other computer nodes of the plurality of computer nodes,
   in order to implement the new distribution plan; and
   wherein the plurality of partitions comprises a plurality of primary partitions and a plurality of backup partitions wherein each primary partition of the plurality of primary partitions is associated with a backup partition of the plurality of backup partitions, and wherein the distribution plan and new distribution plan generated by the distribution coordinator ensure that each primary partition of the plurality of primary partitions is located on a different computer node than the backup partition associated with said each primary partition.

2. The method of claim 1, wherein executing the distribution strategy on said distribution coordinator, using said global sate of the data grid cluster, to determine a new distribution plan which identifies which of said plurality of partitions should be stored on which of said plurality of computer nodes in the data grid cluster further comprises:
   invoking a pluggable distribution logic module by said distribution coordinator, wherein said pluggable distribution logic module is switched at runtime to adjust an algorithm used to distribute said partitions among the cluster of computer nodes.

3. The method of claim 1, further comprising:
performing individual partition transfers point-to-point between two computer nodes of the plurality of computer nodes as a result of direct asynchronous communication between a sender node and a recipient node, wherein the distribution coordinator does not participate in directing said partition transfers.

4. The method of claim 1, wherein the global state of said data grid cluster includes information that indicates a current processing load on each computer node in the data grid cluster, wherein the current processing load is transmitted from said each computer node to the distribution coordinator in said runtime feedback.

5. The method of claim 1, wherein the global state of the data grid cluster includes information that indicates memory capacity and processor capacity of each computer node in the data grid cluster.

6. The method of claim 1, wherein, when executing the distribution strategy, the distribution coordinator ensures that the plurality of backup partitions are stored on a limited subset of the plurality of computer nodes in the data grid cluster.

7. The method of claim 1, wherein the distribution coordinator provides a single point of coordination for distribution of said partitions among the computer nodes in the data grid cluster.

8. The method of claim 1, wherein the new distribution plan specifies that a particular primary partition should be located on a designated computer node in the cluster.

9. A system for managing storage of a large data set partitioned into a plurality of partitions, said system comprising:
one or more microprocessors;
a data grid cluster comprising a plurality of computer nodes, running on the one or more microprocessors, storing the plurality of partitions of the large data set;
a distribution coordinator, which is on one computer node selected from the data grid cluster of computer nodes, wherein said distribution coordinator is configured to perform steps comprising:
executing a distribution strategy to generate a distribution plan which identifies, for all of said plurality of partitions, which of said plurality of partitions should be stored on which of said plurality of computer nodes in the data grid cluster,
storing said plurality of partitions in said memory of said plurality of computer nodes of the data grid cluster in accordance with said distribution plan,
receiving runtime feedback from each of the plurality of computer nodes in the data grid cluster,
analyzing a global state of the data grid cluster, which comprises said distribution plan and said runtime feedback, in order to determine whether changes should be made to the distribution plan,
executing the distribution strategy using said global sate of the data grid cluster, to generate a new distribution plan which identifies, for all of said plurality of partitions, which of said plurality of partitions should be stored on which of said plurality of computer nodes in the data grid cluster;
wherein each of the plurality of computer nodes in the data grid cluster is configured to implement the new distribution plan by performing steps comprising:
accessing the new distribution plan from each of said plurality of computer nodes in the data grid cluster,
analyzing the new distribution plan in each computer node in the data grid cluster to determine whether the new distribution plan specifies changes to which partitions which should be stored in memory of said each node, and if so then one or both of
initiating, in said each of said plurality of computer nodes, a transfer of one or more partition from other computer nodes of the plurality of computer nodes to said each computer node or
initiating, in said each of said plurality of computer nodes, a transfer of one or more partition from said each computer node to other computer nodes of the plurality of computer nodes; and
wherein the plurality of partitions comprises a plurality of primary partitions and a plurality of backup partitions wherein each primary partition of the plurality of primary partitions is associated with a backup partition of the plurality of backup partitions, and wherein the distribution plan and new distribution plan generated by the distribution coordinator ensure that each primary partition of the plurality of primary partitions is located on a different computer node than the backup partition associated with said each primary partition.

10. The system of claim 9, wherein the distribution coordinator invokes a pluggable distribution logic module to provide access to the distribution strategy and to determine whether said changes should be made, wherein said pluggable distribution logic module is switched at runtime to adjust an algorithm used to distribute said plurality of partitions among the computer nodes of the data grid cluster.

11. The system of claim 9, wherein each of the plurality of computer nodes in the data grid cluster is further configured to perform individual partition transfers point-to-point between two computer nodes as a result of direct asynchronous communication between a sender node and a recipient node, wherein the distribution coordinator does not participate in directing said partition transfers.

12. The system of claim 9, wherein the global state of said data grid cluster includes information that indicates a current processing load on each computer node in the data grid cluster, wherein the current processing load is transmitted from each computer node in the data grid cluster to the distribution coordinator in said runtime feedback.

13. The system of claim 9, wherein the global state of the data grid cluster includes information that indicates memory capacity and processor capacity of each computer node in the data grid cluster.

14. The system of claim 9, when executing the distribution strategy, the distribution coordinator ensures that the plurality of backup partitions are stored on a limited subset of the plurality of computer nodes in the data grid cluster.

15. The system of claim 9, wherein the new distribution plan specifies that a particular primary partition should be located on a designated computer node in the cluster.

16. A non-transitory computer readable storage medium storing one or more sequences of instructions executable by one or more processors for managing storage of a large data set partitioned into a plurality of partitions in a data grid cluster comprising a plurality of computer nodes each comprising a microprocessor and memory, which instructions when executed cause said one or more processors to perform steps comprising:
designating one computer node in said data grid cluster to be a distribution coordinator;
executing a distribution strategy on said distribution coordinator to generate a distribution plan which identifies, for all of said plurality of partitions, which of said plurality of partitions should be stored on which of said plurality of computer nodes in the data grid cluster;

storing said plurality of partitions in said memory of said plurality of computer nodes of the data grid cluster in accordance with said distribution plan;

receiving, at the distribution coordinator, runtime feedback from each of the plurality of computer nodes in the data grid cluster;

analyzing, by the distribution coordinator, a global state of the data grid cluster, which comprises said distribution plan and said runtime feedback, in order to determine whether changes should be made to the distribution plan;

executing the distribution strategy on said distribution coordinator, using said global sate of the data grid cluster, to generate a new distribution plan which identifies, for all of said plurality of partitions, which of said plurality of partitions should be stored on which of said plurality of computer nodes in the data grid cluster;

accessing the new distribution plan from each of said plurality of computer nodes in the data grid cluster;

analyzing the new distribution plan in each computer node in the data grid cluster to determine whether the new distribution plan specifies changes to which partitions which should be stored in memory of said each node, and if so then one or both of initiating, in said each of said plurality of computer nodes, a transfer of one or more partition from other computer nodes of the plurality of computer nodes to said each computer node or initiating, in said each of said plurality of computer nodes, a transfer of one or more partition from said each computer node to other computer nodes of the plurality of computer nodes, in order to implement the new distribution plan; and wherein the plurality of partitions comprises a plurality of primary partitions and a plurality of backup partitions wherein each primary partition of the plurality of primary partitions is associated with a backup partition of the plurality of backup partitions, and wherein the distribution plan and new distribution plan generated by the distribution coordinator ensure that each primary partition of the plurality of primary partitions is located on a different computer node than the backup partition associated with said each primary partition.

* * * * *

UNITED STATES PATENT AND TRADEMARK OFFICE
CERTIFICATE OF CORRECTION

PATENT NO. : 9,703,610 B2  
APPLICATION NO. : 13/239253  
DATED : July 11, 2017  
INVENTOR(S) : Lee et al.

Page 1 of 1

It is certified that error appears in the above-identified patent and that said Letters Patent is hereby corrected as shown below:

In the Specification

In Column 7, Lines 29-33, delete "The invention may also be implemented by the preparation of application specific integrated circuits or by interconnecting an appropriate network of conventional component circuits, as will be readily apparent to those skilled in the art." and insert the same on Column 7, Line 28 as a continuation of the same paragraph.

In the Claims

In Column 8, Line 26, in Claim 1, delete "sate" and insert -- state --, therefor.

In Column 8, Line 59, in Claim 2, delete "sate" and insert -- state --, therefor.

In Column 9, Line 56, in Claim 9, delete "sate" and insert -- state --, therefor.

In Column 11, Line 13, in Claim 16, delete "sate" and insert -- state --, therefor.

Signed and Sealed this  
Thirteenth Day of February, 2018

Andrei Iancu  
*Director of the United States Patent and Trademark Office*